Figure 5:
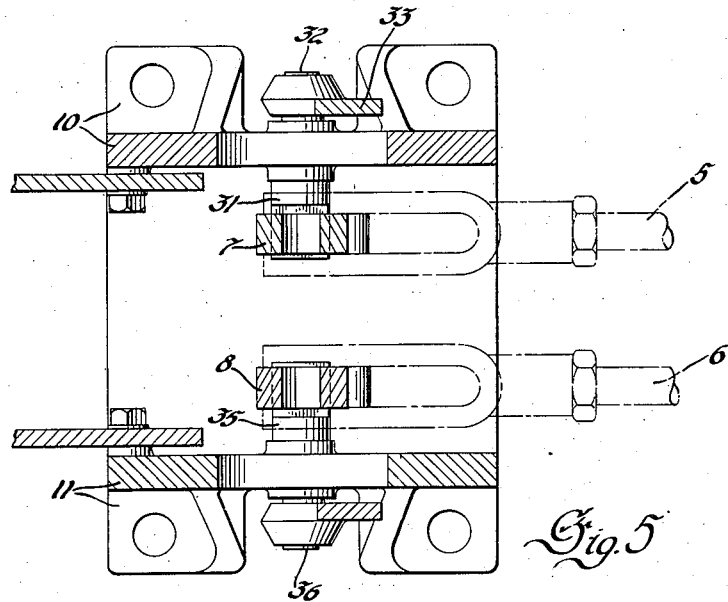

Jan. 9, 1945.  F. G. SHOEMAKER ET AL  2,367,064
EQUALIZER FOR DUAL CLUTCHES
Filed March 10, 1944   3 Sheets-Sheet 1
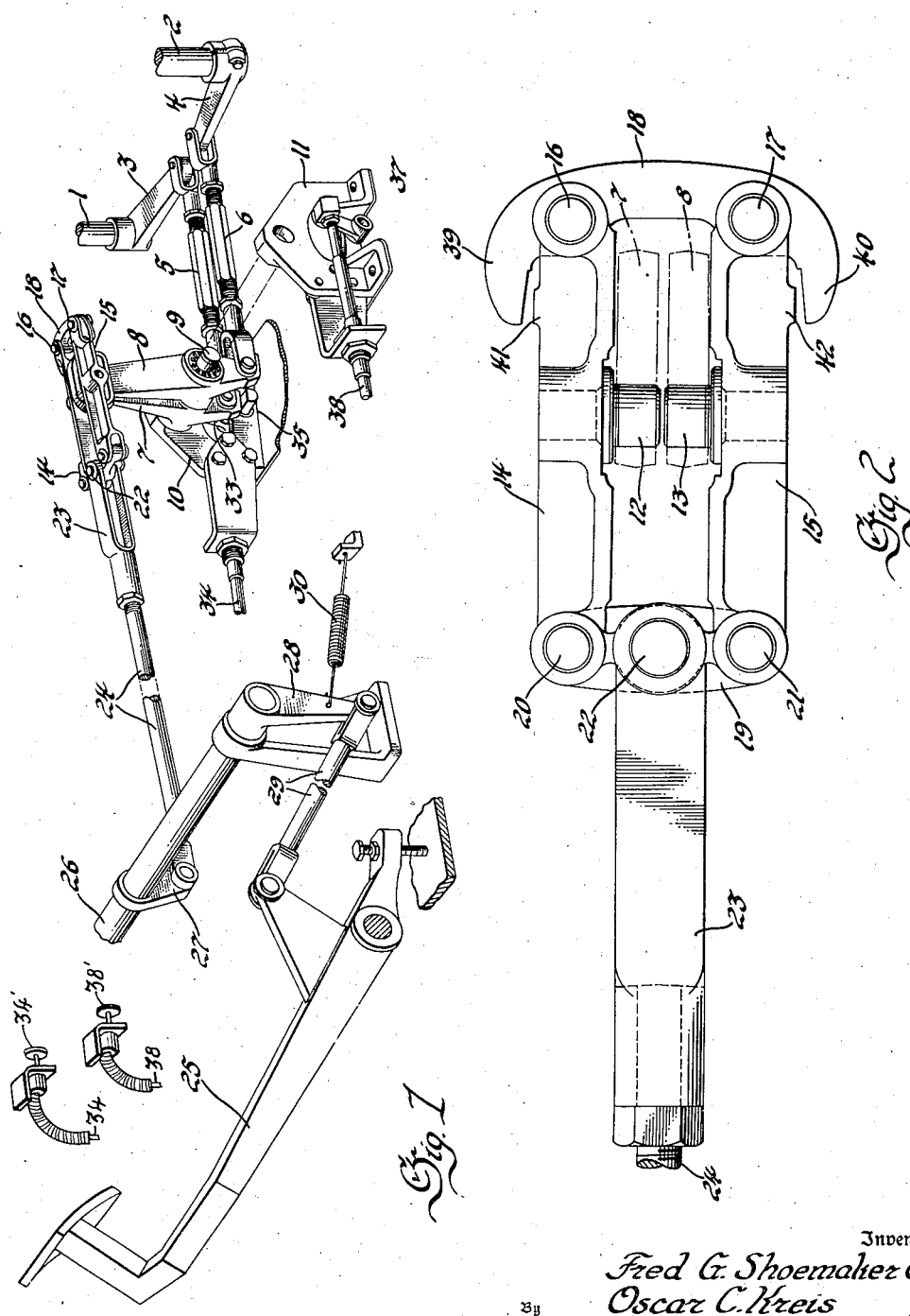
Inventors
Fred G. Shoemaker &
Oscar C. Kreis
By Blackmore, Spencer & Hiner
Attorneys

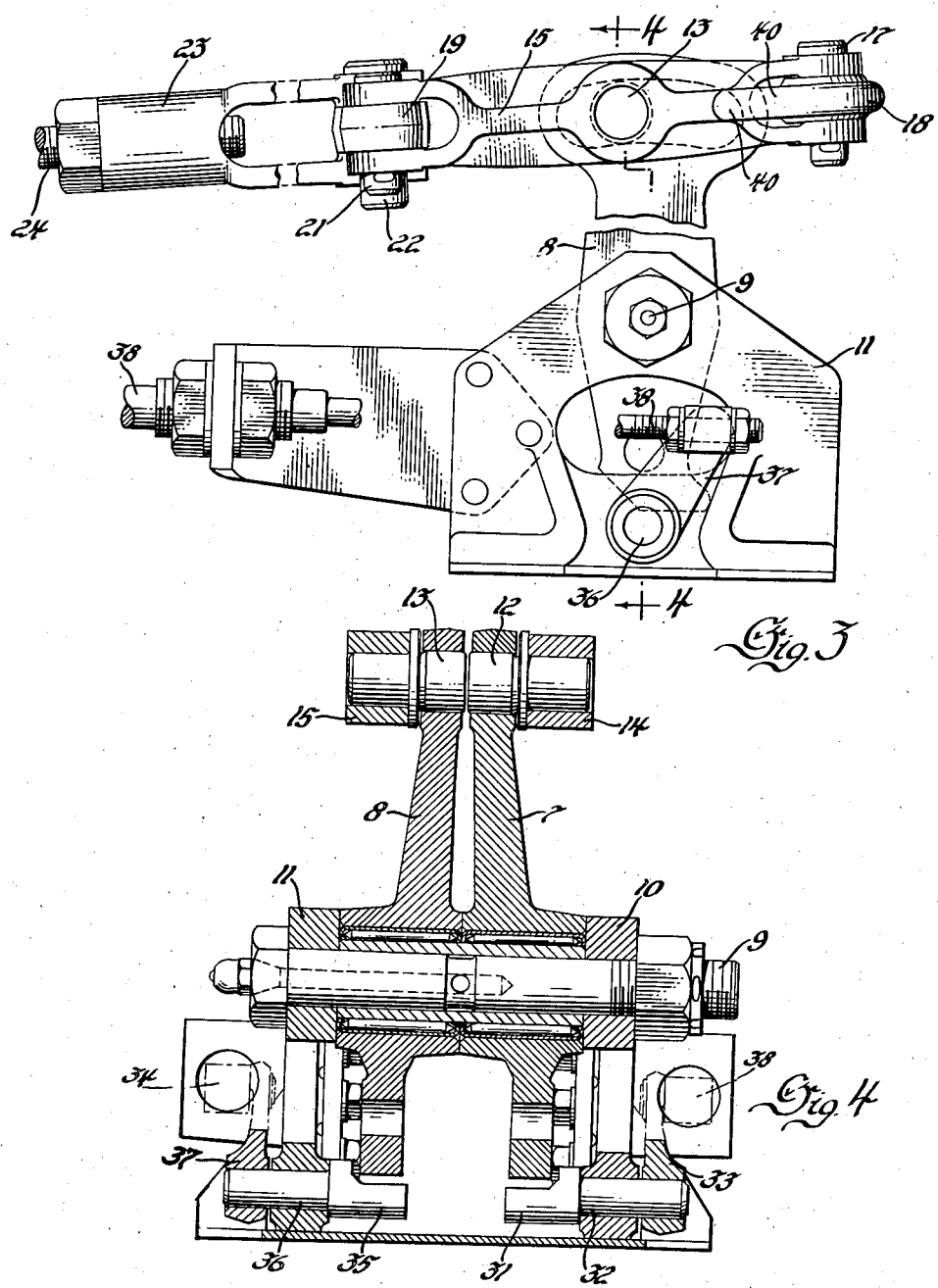

Jan. 9, 1945.  F. G. SHOEMAKER ET AL  2,367,064
EQUALIZER FOR DUAL CLUTCHES
Filed March 10, 1944  3 Sheets-Sheet 3

Inventors
Fred G. Shoemaker &
Oscar C. Kreis
By Blackmore, Spencer & Flint
Attorneys Patented Jan. 9, 1945

2,367,064

UNITED STATES PATENT OFFICE 2,367,064

EQUALIZER FOR DUAL CLUTCHES

Fred G. Shoemaker and Oscar C. Kreis, Birmingham, Mich., assignors to General Motors Corporation, Detroit, Mich., a corporation of Delaware Application March 10, 1944, Serial No. 525,844

6 Claims. (Cl. 74—478)

This invention deals with control mechanism whereby two instrumentalities may be operated either conjointly or independently from a single manual controller and more particularly to an improved motion transmitting linkage which equalizes actuating force when both instrumentalities are in service and automatically restricts equalizing action when either instrumentality is selectively put out of use.

In an exemplary situation the linkage is applied to a dual engine vehicle and controls both drive clutches from a common foot pedal, there being incorporated in the system lockout mechanism whereby either clutch selectively may be held in disengaged or inoperative setting if the operator chooses to drive the vehicle by one engine only. Conventional friction drive clutches depend on spring pressure to keep the driving and driven elements in coupled relation and declutching is effected by spring retraction upon pedal depression. Wear of the parts requires adjustment of the linkage from time to time but if two of such clutches are under the control of a single pedal the nicety of adjustment is difficult to maintain for simultaneous clutch engagement and disengagement. Accordingly it has been proposed to transmit pedal movement to the twin clutch throwout mechanism through an equalizer bar so that the relative resistance causes equal distribution of the throwout force for a more nearly concurrent clutch action without regard to relative wear and fine adjustment. Inasmuch as only one clutch is to be operated on occasions and by pedal travel through substantially the same range provision is here made automatically to confine equalizer action and when either clutch is locked in its released position and by reason of a lost motion connection with the pedal is outside the influence of and itself offers no resistance to pedal travel. Accordingly the equalizer linkage is designed to become ineffective for single clutch operation.

In the preferred embodiment of the invention a parallelogram linkage is employed in which the two side links having pin and slot connection with a pair of clutch actuating levers, either of which may be selectively locked in inoperative setting, with one end linkage serving as an equalizer lever and having a fulcrumed connection with the pedal drawbar and the other end link having side projections for cooperation with the side links to limit in both directions the extent to which the links may be folded in compensating for relative variation in resistance to linear link travel in the operation of the respective clutches.

The structure and operation will be better understood upon reference to the accompanying drawings wherein Figure 1 is a perspective view of the clutch control linkage and with one of the bracket sub-assemblies dismounted for clarity of illustration; Figure 2 is a top plan view on a large scale of the parallelogram linkage; Figure 3 is a side elevation of the compensating linkage and the dual clutch operating levers associated therewith; Figure 4 is a vertical sectional view illustrating the mounting of the clutch operating levers and is taken substantially on line 4—4 of Figure 3; Figure 5 is a horizontal section taken near the bottom of Figure 4 and showing the mounting brackets and the lockout parts for selectively retaining the clutch throwout levers in declutched position and Figures 6 and 7 are detail views illustrating the relative position of the parts with either throwout lever in locked and unlocked position, respectively.

In the drawings the reference numerals 1 and 2 indicate conventional rockshafts of the clutch throwout mechanism for a pair of clutches in a dual engine assembly. These rockshafts 1 and 2 terminate in levers 3 and 4, respectively, for connection by turnbuckles 5 and 6 with the lower ends of throwout levers 7 and 8 pivotally mounted side by side on a common trunnion shaft 9 supported in side brackets 10 and 11. At their upper ends each lever 7 and 8 is formed with an elongated slot, as best shown by dotted lines in Figure 3. Slidably located and guided within these slots are inwardly projected heads 12 and 13 of mounting pins carried by side links 14 and 15, respectively. The side links with the folding parallelogram figure are interconnected at their rear ends through pivot pins 16 and 17 to an end link or tie bar 18 and the side links 14 and 15 are interconnected at their forward ends to an equalizer bar 19 pivoted at one end by a pin 20 to the side link 14 and at its opposite end by a pin 21 to the side link 15. Centrally of the equalizer bar 19 a pivot pin 22 connects it with a clevis 23 adjustably mounted on a pedal drawbar 24 suitably linked to the pivoted clutch pedal 25. The linkage shown in the drawings includes a rockshaft 26 having spaced lever arms 27 and 28 connected, respectively, to the drawbar 24 and to the pedal 25 by a connecting rod 29. A pedal return spring 30 is anchored at one end to a stationary part of the vehicle and is hooked at its other end on the lever 28.

From the structure as thus far described it will be apparent that depression of the foot pedal 25 is transmitted through the linkage to rock both of the clutch shafts 1 and 2 for moving both clutches from engaged to disengaged settings and that release of the clutch pedal 25 permits re-engagement of both clutches as would normally occur in the control of conventional clutch mechanisms. It will further be apparent that clutch pedal travel is transmitted through the equalizer bar 19 to the parallel side links 14 and 15 for dividing the force equally so that both clutches disengage at the same time.

Figure 6:
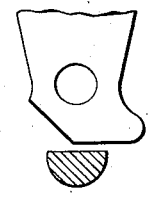
Figure 7:
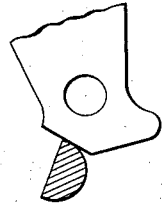

In order to lock out either of the clutches in disengaged position in the event the vehicle is to be operated from only one engine the lower ends of both throwout levers 7 and 8 are formed with abutment surfaces, as illustrated in Figures 6 and 7, and independent latches are provided to engage the abutment surfaces after the levers have been shifted to declutching position. The latch for the lever 7 consists of a crank or eccentric head 31 on the inner end of a rockshaft 32 mounted in the bracket 10 and having an actuating lever 33 connected to a cable or push-pull rod 34 which extends to an operating lever or button 34' on the dashboard or within convenient reach of the operator. Similarly the latch for the companion lever 8 includes a crank 35 on a pin 36 mounted in the bracket 11 and provided with a lever arm 37 connected with a push-pull rod 38 which leads to an operating button 38' in the operator's compartment. When both lockout abutments 31 and 35 are in the position shown in Figures 4 and 6 both clutches are in engaged position and may be engaged and re-engaged by the operation of the common foot pedal as before described. Whenever it is desired to put one of the engines out of service both clutches are disengaged and the operator selectively throws one of the crank arms 31 or 35 into the position illustrated in Figure 7 so that the corresponding clutch will be divorced from foot pedal action. Now when the foot pedal is released the unlocked clutch will go to engaged position with the pin and slot connection at the upper end of the locked lever 7 or 8 accommodating the relative movement of the levers. In order to direct all of the force of pedal depression to the active clutch the equalizing action of the parallel linkage is confined to limit folding of the side links 14 and 15 and as shown in Figure 2 the result is accomplished by forming the end tie bar 18 of substantially U-shape so that its forwardly extending legs 39 and 40 project beside the links 14 and 15, respectively. Normally the legs 39 and 40 are spaced a slight distance from the seats 41 and 42 formed on the links and the spacing determines the limit of equalization in both directions. In other words, if the link 14 tends to move ahead under pedal drawbar force the leg 39 comes into abutting contact with the seat 41 and causes the link to move forward together as a rigid assembly. Likewise as the link 15 moves ahead the arm 40 abuts the seat 42 to afford a rigid link assembly.

Essentially the object to be accomplished is the equalization of applied force for conjoint control of dual clutches and the limitation of relative link motion when the clutches are separately operated.

We claim:

1. Control mechanism for dual clutches or the like including a pair of motion transmitting members movable from one setting to another, means operable to lock either of said members selectively in one of said settings, a common control element for moving both of said members and an equalizer interconnection between the control element and said members including relatively movable parts comprising an equalizer bar fulcrumed to said element, a pair of side links pivotally connected with the equalizer bar for cooperation with the members, respectively, having pickup abutments engageable with mating seats on the members to move the same from one setting to the other, and a tie bar pivoted on both links in spaced relation with the equalizer bar and cooperating stops on adjacent relatively movable parts of the equalizer interconnection to limit response to equalization.

2. Control mechanism of the character described, comprising a pair of members to be shifted either conjointly or selectively, a pair of links having pickup engagement with said members, respectively, an equalizer device for transmitting travel to said links, means to limit relative movement of the links under travel with the equalizer device and means to retain either of said members out of pickup engagement with said links.

3. Control mechanism of the character described, comprising a folding parallelogram having interpivoted side and end links, cooperating limit stops carried by certain of the links for bumper engagement with adjacent links to limit parallelogram collapse, a drawbar fulcrum connection on one of the end links, a pair of members to be operated having pin and slot connection with the side links, respectively, and lockout mechanism cooperatively related to said pin and slot connection and operative to divorce member operation from link travel.

4. Control mechanism of the character described, including a pair of motion transmitting levers, means to block lever motion, a pair of spaced parallel links having lost motion connection with said levers, respectively, a pair of spaced swingable bars interconnecting said links by pivot connections therewith, means to limit swinging movement of the bars relative to said links and a drawbar having a fulcrum connection with one of said bars.

5. Control mechanism of the character described, including a drawbar, a pair of operating members, means for selectively blocking travel of either of said members, a pair of links having pin and slot connection with said members, respectively, an equalizer bar pivoted at opposite ends to adjacent ends of said links and centrally to said drawbar, and a tie bar pivotally connected at spaced points to the opposite ends of said links and provided with leg extensions projecting beside the links for engagement thereafter to limit the range of equalizing bar action.

6. Control mechanism of the character described, a drawbar, a pair of elements to be operative, a pair of motion transmitting links for said members, respectively, an equalizer bar having pivotal connection with said links and fulcrumed to said drawbar, a U-shaped tie bar having transversely spaced pivotal connection with said links with its legs extending beside the links normally in spaced relation thereto and adapted for abutment with the links to limit the range of equalizer action.

FRED G. SHOEMAKER.
OSCAR C. KREIS.